United States Patent [19]
Solt

[11] Patent Number: 4,616,579
[45] Date of Patent: Oct. 14, 1986

[54] APPARATUS FOR INJECTING LIQUID MANURE INTO THE GROUND

[76] Inventor: Wayne J. Solt, 473 Rte. 73 South, Pearl City, Ill. 61062

[21] Appl. No.: 718,493

[22] Filed: Apr. 1, 1985

[51] Int. Cl.$^4$ ............................................. A01C 23/02
[52] U.S. Cl. ......................................................... 111/7
[58] Field of Search ................................. 111/6, 7, 87

[56] References Cited

U.S. PATENT DOCUMENTS

| | | | |
|---|---|---|---|
| 3,174,446 | 3/1965 | Clarke et al. | 111/7 |
| 4,294,181 | 10/1981 | Smith | 111/7 X |
| 4,506,610 | 3/1985 | Neal | 111/87 |

FOREIGN PATENT DOCUMENTS

| | | | |
|---|---|---|---|
| 124777 | 7/1947 | Australia | 111/87 |
| 2651877 | 5/1978 | Fed. Rep. of Germany | 111/7 |
| 450550 | 9/1975 | U.S.S.R. | 111/7 |

OTHER PUBLICATIONS

Brochure published by J. E. Love Company, 1984 (4 pages).

Primary Examiner—James R. Feyrer
Attorney, Agent, or Firm—Leydig, Voit & Mayer, Ltd.

[57] ABSTRACT

Liquid manure contained in a trailer-mounted tank is supplied to a downwardly extending injector pipe whose lower end carries a disc adapted to rotate about the axis of the pipe. During forward travel of the trailer, the rotatable disc slices through the ground to permit the pipe to inject a stream of liquid manure into the ground below the surface thereof, the disc causing the manure to be spread thinly and relatively uniformly in the ground to stimulate crop growth rather than depressing it because of over application to a confined area.

7 Claims, 3 Drawing Figures

APPARATUS FOR INJECTING LIQUID MANURE INTO THE GROUND

BACKGROUND OF THE INVENTION

This invention relates generally to apparatus for applying liquid manure to a field to enable the liquid manure to serve as crop fertilizer.

Liquid manure takes the form of a very flowable sludge which may be contained in a trailer-mounted tank adapted to be towed across the field. As the trailer travels across the field, the liquid manure is pumped from the tank and is ejected downwardly out of hoses which, in some instances, are located behind earth-working shanks carried by the trailer and similar to the shanks of a chisel plow. The shanks dig spaced channels for receiving the manure.

Presently available apparatus for applying liquid manure is not capable of effecting uniform distribution of the manure in the ground. Much of the otherwise beneficial fertilizing effect of the manure is lost due to the poor distribution and, in addition, seeds will not grow in areas where the manure is heavily concentrated.

SUMMARY OF THE INVENTION

The general aim of the present invention is to provide new and improved apparatus for injecting liquid manure into the ground and for causing the manure to spread more thinly and uniformly than has been possible with prior apparatus.

A more detailed object of the invention is to achieve the foregoing by providing apparatus in which the liquid manure is injected into the ground through a downwardly extending pipe whose lower end carries a generally circular disc. The disc preferably rotates about the axis of the pipe and slices through the ground to enable the pipe to inject a stream of liquid manure into the ground below the surface thereof. The underside of the disc preferably is concave and defines a baffle adjacent the lower end of the pipe causing the stream of liquid manure to spread thinly and to be distributed substantially uniformly within the ground.

Another object of the invention is to mount the pipe and the disc in a unique manner enabling both the depth of penetration and the angle of the disc to be adjusted quickly and easily.

The invention also resides in a novel structure for mounting a disc to rotate with an injector pipe and for enabling quick and easy detachment of the disc from the pipe for purposes of repair or replacement.

These and other objects and advantages of the invention will become more apparent from the following detailed description when taken in conjunction with the accompanying drawings.

DETAILED DESCRIPTION OF THE PREFERRED EMBODIMENT

Figure 1:
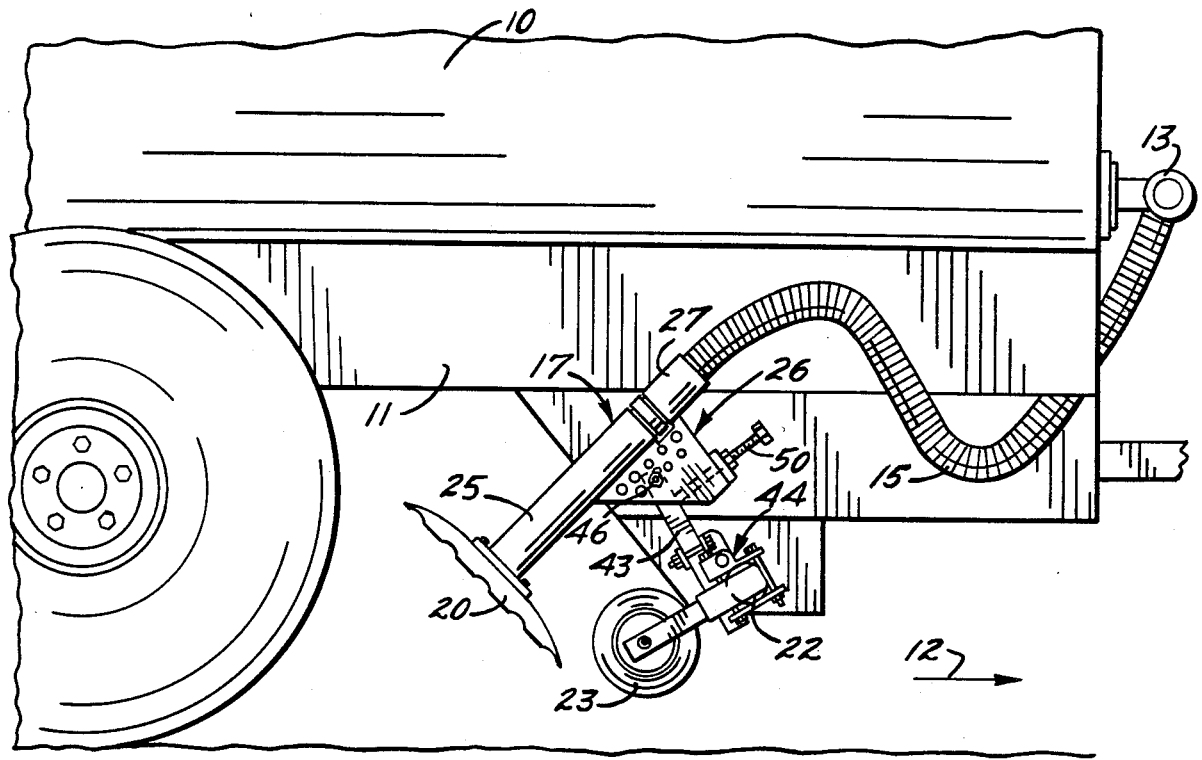
FIG. 1 is a side elevational view of a typical trailer-mounted tank equipped with new and improved liquid manure injecting apparatus incorporating the unique features of the present invention, the injecting apparatus being shown in a raised transport position.

As shown in the drawings for purposes of illustration, the invention is embodied in apparatus for applying liquid manure to an agricultural field so that the liquid manure may serve as fertilizer for crops. The liquid manure is contained in a large tank 10 carried on a trailer 11 adapted to be towed over the field in the direction of the arrows 12, the trailer thus being shown in the drawings as moving from left-to-right.

A pump (not shown) is associated with the tank 10 and causes the liquid manure in the tank to be delivered to a laterally extending manifold 13 for distribution through laterally spaced, flexible hoses, one hose being shown in the drawings and being identified by the reference numeral 15. There is at least one hose 15 on each side of the tank 10 and, in most instances, two or more laterally spaced hoses are located on each side of the tank to enable the liquid manure to be distributed across a relatively wide swath.

In accordance with the present invention, provision is made of a unique injector 17 having a pipe 18 (FIG. 3) which injects a stream of liquid manure into the ground below the surface thereof and which carries a disc 20 for slicing through the ground to enable injection of the liquid manure into the ground from the pipe and to cause the stream of manure to be spread thinly and substantially uniformly throughout the ground. As a result of spreading the manure substantially uniformly, the fertilizing qualities of the manure are more fully realized and, in addition, the thinly spread manure stimulates crop growth rather than depressing the growth because of over application to a confined area.

More specifically, one injector 17 is associated with each of the hoses 15. The injectors on each side of the trailer 11 are mounted on a horizontal tool bar 22 extending laterally from the trailer. Herein, each tool bar is mounted on the trailer to rotate about its own axis and carries a ground wheel 23 on its outer end. By rotating the tool bar 22 about its own axis with conventional power-operated mechanism (not shown), the injectors 17 may be moved between an inactive transport position (FIG. 1) and an active working position (FIG. 2), the wheel 23 engaging the ground and supporting the outer end of the tool bar when the injectors are in their working position. When the injectors are in their transport position, the tool bars may be folded rearwardly about vertical axes to allow the trailer to be towed on a roadway.

In the present instance, each injector pipe 18 is substantially vertical when disposed in its working position and is journaled within a sleeve 25 (FIG. 3) to rotate about its own axis. The sleeve 25 is attached rigidly to a mounting bracket 26 and is spaced below a second sleeve 27 which also is secured rigidly to the mounting bracket. The hose 15 extends tightly into the sleeve 27 and includes a reduced diameter portion 28 which is telescoped into the upper end portion of the pipe 18 with a snug but rotatable fit. The liquid manure flows into the pipe through the hose 28 and flows out of the pipe in a stream having a diameter of about 3½ inches.

Figure 3:
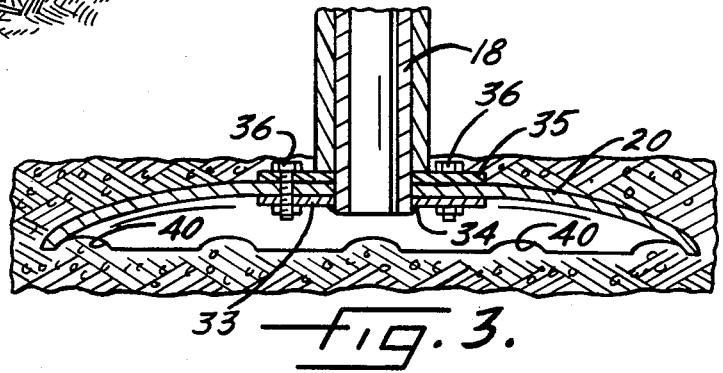
FIG. 3 is an enlarged fragmentary cross-section taken substantially along the line 3—3 of FIG. 2.

As shown in FIG. 3, the upper and lower end portions of the injector pipe 18 project beyond the upper and lower end portions of the sleeve 25. A collar 30 is located in the space between the two sleeves 25 and 27 and is secured to the upper end portion of the pipe by a screw 31. The collar rotates with the pipe and captivates the pipe against downward movement within the sleeve.

In keeping with the invention, the disc 20 is mounted on the lower end portion of the injector pipe 18 to rotate about the axis of the pipe, the disc herein rotating in unison with the pipe. For this purpose, a radially extending flange 33 (FIG. 3) underlies the disc 20 and is welded rigidly at 34 to the lower end of the pipe 18. A second flange 35 overlies the disc and abuts the lower end of the sleeve 25. Bolts 36 extend through the flanges and the disc and clamp the disc tightly between the flanges. By loosening the screw 31 to release the collar 30 from the pipe 18, the latter may be pulled downwardly out of the sleeve 25. By then removing the bolts 36, the disc 20 and the upper flange 35 may be detached from the lower flange 33 and slipped upwardly off of the upper end of the pipe to permit repair or replacement of the disc.

The disc 20 is generally circular and is in the shape of an inverted dish having a diameter of about 24 inches. The underside of the disc is concave and defines a downardly concave baffle around the lower end of the injector pipe 18. As shown in FIG. 3, the outer periphery of the disc is disposed in a plane which is located below the plane containing the lower end of the pipe. Angularly spaced notches 40 are formed in the outer peripheral portion of the disc.

Figure 2:
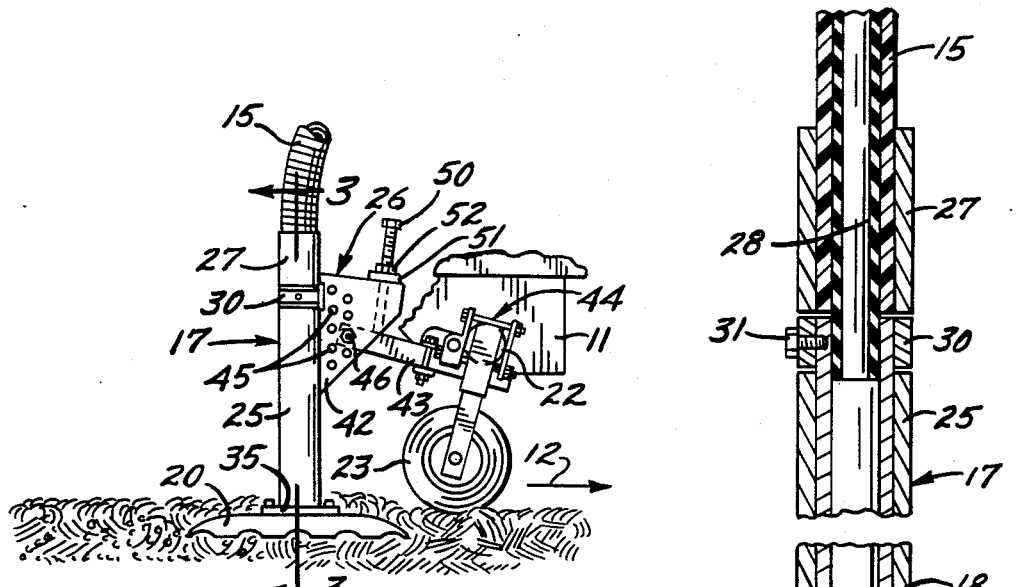
FIG. 2 is a fragmentary side elevational view similar to FIG. 1 but shows the injecting apparatus lowered to a working position.

When the injector 17 is in its working position shown in FIGS. 2 and 3, the injector pipe 18 is substantially vertical and thus the disc 20 is substantially horizontal. When the trailer 11 is pulled forwardly, the forward portion of the disc slices through the ground and cuts a path for the lower end portion of the pipe. Liquid manure delivered to the pipe via the hoses 15 and 28 is ejected in a stream out of the lower end of the pipe and is injected into the ground. As the rear end portion of the disc travels past the point of injection, the newly injected manure is worked into the earth by the disc and is spread thinly and substantially uniformly. The notches 40 in the disc define outlets which permit the manure to spread radially from the disc.

In normal operation, the disc 20 is set to allow the injector pipe 18 to penetrate into the ground to a depth of 2 to 3 inches. To enable the depth of penetration to be changed for differing ground conditions, the bracket 26 is mounted for selective vertical adjustment.

Herein, the bracket 26 includes a pair of laterally spaced plates 42, only one of which is visible, welded rigidly to and extending forwardly from the sleeves 25 and 27. The plates straddle a bar 43 extending rearwardly from the tool bar 22. Clamping structure indicated generally at 44 secures the rear end of the bar 43 to the underside of the bar 22. The clamping structure may include conventional spacing shock absorbers (not shown) to permit the bar 43 to pivot upwardly on the bar 22 in the event the disc 20 strikes an obstruction.

Two rows of vertically spaced holes 45 (FIG. 2) are formed through the plates 42 of the bracket 26. A fastener in the form of a horizontal bolt 46 extends through alined ones of the holes 45 and through a hole (not visible) in the bar 43 to connect the bracket 26 to the bar. By inserting the bolt 46 through a different pair of holes 45, the bracket 26 may be adjusted vertically relative to the bar 43 to change the depth of penetration of the disc 20.

Adjustment of the angle of attack of the disc 20 may be effected by a bolt 50 threaded into a nut 51 on the bracket 26 and having a lower end bearing against the upper side of the bar 43. By loosening a lock nut 52, the bolt 50 may be turned to cause the bracket 26 to pivot around the bolt 46 and thereby adjust the disc to a horizontal plane. In some cases, it may be desirable to adjust the disc so that it is inclined downwardly and forwardly at a slight angle.

From the foregoing, it will be apparent that the present invention brings to the art a new and improved liquid manure injector 17 in which a rotatable disc 20 slices through the ground to permit the lower end of the injector pipe 18 to penetrate the ground, the disc also serving as a baffle for the stream of liquid manure ejected from the pipe and serving to work the manure into the ground. The liquid manure is spread by the disc and fertilizes the ground more uniformly than has been possible heretofore.

I claim:

1. Apparatus for injecting liquid manure into the ground and for spreading the liquid manure in the ground, said apparatus being adapted for use with a forwardly traveling vehicle carrying a tank of liquid manure, said apparatus comprising upper and lower axially spaced and axially alined sleeves, means for mounting said sleeves non-rotatably on said vehicle in an upright position, an elongated pipe telescoped into and rotatable within said lower sleeve and having upper and lower ends projecting beyond the upper and lower ends of the lower sleeve, a collar located between and rotatable relative to said sleeves, said collar being connected to the upper end of said pipe and being engageable with the upper end of said lower sleeve to prevent said pipe from sliding downwardly within said lower sleeve, means for releasably coupling said collar to said pipe to permit said pipe to be withdrawn from said lower sleeve out of the lower end of the lower sleeve, a flexible hose communicating with said tank and having an outlet end portion telescoped into said upper sleeve, the outlet end portion of said hose having a reduced diameter lower end telescoped into and communicating with the upper end of said pipe to deliver liquid manure into the pipe, a generally circular disc mounted rigidly on the lower end portion of said pipe to rotate in unison with the pipe and to slice through the ground during forward travel of the vehicle, the underside of said disc being downwardly concave and defining a baffle around the lower end of the pipe, and the periphery of said disc being formed with angularly spaced notches whereby liquid manure delivered to said pipe is injected into the ground through the lower end of said pipe and is spread into the ground by the rotary disc while flowing radially out of the notches in the periphery of the disc.

2. Apparatus as defined in claim 1 further including means for selectively adjusting the elevation of said sleeves and said pipe to change the depth of penetration of said disc.

3. Apparatus as defined in claim 2 further including means for adjusting the angle of inclination of said sleeves and said pipe to change the angle of said disc relative to the ground.

4. Apparatus as defined in claim 1 further including means for adjusting the angle of inclination of said sleeves and said pipe to change the angle of said disc relative to the ground.

5. Apparatus as defined in claim 1 further including upper and lower mounting flanges encircling the lower end portion of said pipe with the upper flange being engageable with the lower end of said lower sleeve, one of said flanges being secured rigidly to the lower end portion of said pipe, said disc being sandwiched between said mounting flanges, and selectively releasable means for clamping said disc between said flanges.

6. Apparatus as defined in claim 1 further including a mounting bracket connected rigidly to and projecting forwardly from said sleeve and having a series of substantially vertically spaced holes formed therethrough, a mounting bar extending forwardly from said bracket, and a releasable fastener extending horizontally through one of said holes and extending through said bar to connect said bracket to said bar.

7. Apparatus as defined in claim 6 in which said fastener connects said mounting bracket to said bar to pivot about a horizontal axis, and selectively adjustable means connected between said bracket and said bar for selectively pivoting said bracket about said horizontal axis.

* * * * *